United States Patent [19]
Shige et al.

[11] Patent Number: 5,899,794
[45] Date of Patent: May 4, 1999

[54] TEXTURING METHOD

[75] Inventors: Tomoo Shige; Masataka Yokoyama; Makabe Yasushi, all of Kurashiki, Japan

[73] Assignee: Mitsubishi Chemical Corporation, Tokyo, Japan

[21] Appl. No.: 08/997,323

[22] Filed: Dec. 23, 1997

[30] Foreign Application Priority Data

Dec. 26, 1996 [JP] Japan .................................. 8-348035
Dec. 26, 1996 [JP] Japan .................................. 8-348036

[51] Int. Cl.⁶ .................................................. B24B 21/00
[52] U.S. Cl. ................................ 451/41; 451/59; 451/36; 451/304; 451/307
[58] Field of Search .................................. 451/41, 59, 60, 451/299, 302, 304, 36, 307

[56] References Cited

U.S. PATENT DOCUMENTS

| | | |
|---|---|---|
| 5,148,639 | 9/1992 | Sakai et al. ................................ 451/304 |
| 5,207,759 | 5/1993 | Mehmandoust et al. . |
| 5,209,027 | 5/1993 | Ishida et al. ................................ 451/59 |
| 5,307,593 | 5/1994 | Lucker et al. ............................ 451/307 |
| 5,443,415 | 8/1995 | Shebanow et al. ...................... 451/302 |
| 5,490,809 | 2/1996 | Jones et al. ................................ 451/60 |

*Primary Examiner*—Eileen P. Morgan
*Attorney, Agent, or Firm*—Dike, Bronstein, Roberts & Cushman, LLP; David G. Conlin

[57] ABSTRACT

A method for polishing or texturing a magnetic disc, comprises bringing a tape traveled in a predetermined direction and made of fibers having a fineness of not more than 0.1 denier, and a slurry containing polishing grains dispersed therein, into contact with a substrate of the magnetic disc. Such method has an extremely low surface roughness (Ra) and an extremely low maximum projection height (Rp) with an excellent high accuracy, thereby efficiently producing a magnetic recording medium which is free from head crash and errors upon reading and writing of information.

7 Claims, 2 Drawing Sheets

TEXTURING METHOD

BACKGROUND OF THE INVENTION

The present invention relates to a method for texturing a magnetic disc, and more particularly to a method for efficiently and precisely polishing or texturing a surface of a substrate of a magnetic disc.

In recent years, magnetic recording media such as magnetic discs have been increasingly utilized as an external storage device in association with the development of information processing techniques such as computers.

Hitherto, as the magnetic recording media, there have been used those produced by subjecting an aluminum alloy substrate to an alumite treatment or plating the substrate with a non-magnetic material such as Ni—P, and then forming in turn a undercoat layer composed of Cr or the like, a magnetic thin film layer composed of Co-based alloy and a protective layer composed of a carbonaceous material on the substrate.

Further, in association with recent increasing demands for high capacity and high density of such magnetic recording media, the distance between a magnetic disc and a magnetic head, i.e., the flying height of the magnetic head from the surface of the magnetic disc has been required to be reduced to a value as low as 0.15 μm or less. However, in the case where such an extremely small flying height of the magnetic head is used, when any unusual projections exist on the surface of the magnetic disc, there arises a risk that the magnetic head and the projections are contacted with each other, thereby causing a head crash and damaging the surface of the magnetic disc. Even when the projections are not so high as to undergo the head crash, the contact between the magnetic head and the projections is likely to cause various errors upon reading and writing of information.

On the other hand, miniaturization of the magnetic discs has been demanded in addition to the high capacity and high density. For this reason, a spindle motor or the other components used in a disc driving apparatus have also been required to be correspondingly miniaturized in size. This tends to cause the lack of motor torque, so that there arises such a phenomenon that the magnetic head is stuck and fixed on the surface of the magnetic disc, and therefore, cannot fly thereover. In order to prevent, the sticking of the magnetic head onto the surface of the magnetic disc by reducing the contact area therebetween, there have been used so-called "texturing", i.e., formation of fine traces or traces on the surface of the magnetic disc substrate.

Hitherto, as the methods of applying the texturing onto the surface of the magnetic disc substrate, there are known, for example, a tape abrasion method using a fixed grinding particle-type polishing tape (Japanese Patent. Application Laid-open (KOKAI) No. 1-86320(1989), etc.), a slurry abrasion method using a polishing tape to a surface of which a slurry containing polishing grains is applied (Japanese Patent Application Laid-open (KOKAI) No. 3-147518 (1991), etc.), or the like.

However, in the case where the magnetic disc substrate is surface-treated by the texturing to such an extent as to satisfy both a flying property (low flying height, high flying stability, etc.) of the magnetic head and a high anti-wear property (i.e., reduction in surface roughness of the substrate and strengthening of the finishing treatment of the disc), the surface roughness of the substrate must be extremely reduced to meet the requirement of recent drastic increase in recording capacity and recording density of magnetic recording media.

That is, it has been required to achieve, with a high accuracy, extremely low surface roughness (Ra), for example, not more than 15 Å and extremely low maximum projection height (Rp), for example, not more than 40 Å, by the texturing. Further, the texturing must be conducted with a high efficiency as well as the high accuracy.

However, in the afore-mentioned conventional texturing methods, it has been extremely difficult to conduct the texturing with such a high accuracy.

As a result of the present inventors' earnest studies to solve the afore-mentioned problems, it has been found that by bringing a specific tape into contact with a magnetic disc substrate in a slurry in which polishing grains are dispersed, there can be formed a textured surface of the magnetic disc substrate, which can exhibit a low surface roughness (Ra) and a low maximum projection height (Rp) with an excellent high accuracy. The present invention has been attained on the basis of this finding.

SUMMARY OF THE INVENTION

It is an object of the present invention to provide a method for forming a textured surface which has an extremely low surface roughness (Ra) and an extremely low maximum projection height (Rp) with an excellent high accuracy, thereby efficiently producing a magnetic recording medium which is free from head crash and errors upon reading and writing of information.

To accomplish the aim, in a first aspect of the present invention, there is provided a method for polishing or texturing a magnetic disc, comprising bringing a tape traveled in a predetermined direction and made of fibers having a fineness of 0.1 denier, and a slurry containing polishing grains dispersed therein into contact with a substrate of the magnetic disc.

DETAILED DESCRIPTION OF THE INVENTION

Figure 1:
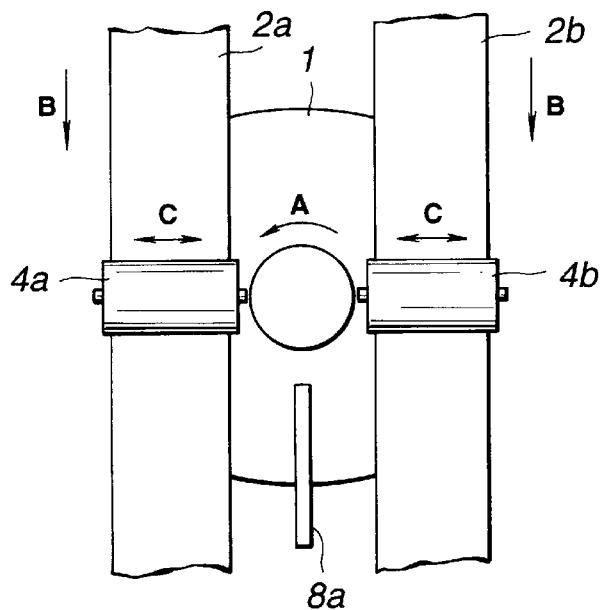

As the non-magnetic substrate of the magnetic recording medium according to the present invention, there may be used those substrates formed by processing a disc-shaped substrate made usually of an aluminum alloy into a predetermined thickness, subjecting the surface of the disc-shaped substrate to a specular finish process, and forming on the finished surface of the substrate a surface layer composed, for example, of non-magnetic metal such as Ni—P alloy or Ni—Cu—P alloy and having a thickness of about 5 μm to about 20 μm by electroless plating. The thus-obtained non-magnetic substrates are usually subjected to a surface polishing process and then a texturing process to form specific irregularities and texture patterns on the surface thereof.

The polishing process may be carried out, for example, by interposing the substrate between polishing pads onto which surfaces polishing grains are adhered and impregnated, while supplying a surfactant-containing polishing solution thereto. In general, the surface layer of the substrate is polished to such an extent that the thickness of the surface layer is reduced by about 2 μm to about 5 μm. In addition, the polished surface of the substrate is subjected to the specular finishing process such that the surface roughness Ra thereof is not more than 50 Å, preferably not more than 30 Å.

The texturing according to the present invention is a process or treatment by which predetermined traces are formed on the surface of the substrate, irrespective of the surface roughness of the substrate before and after conducting the texturing.

Specifically, the texturing may include not only a process for forming predetermined traces on the surface of the substrate having a small surface roughness, but also a process for forming predetermined traces on the surface having a large surface roughness and then reducing the surface roughness while the traces remain thereon. Incidentally, the latter treatment can also be considered to be a polishing treatment. For this reason, in the present invention, texturing and polishing treatments are dealt identically.

In general, the texturing in the present invention can be applied onto the surface subjected to the specular finishing process. The texturing according to the present invention can be conducted by a slurry abrasion using a polishing slurry and a polishing tape.

The polishing slurry may be in the form of a suspension in which the polishing grains are dispersed together with a dispersant.

As the polishing grains, there may be used, for example, white alumina-based polishing grains, silicon carbide-based polishing grains, single crystal diamond-based polishing grains, polycrystalline diamond-based polishing grains or the like. The average particle size of the polishing grains may be usually in the range of 0.05 $\mu$m to 10 $\mu$m, preferably 0.1 $\mu$m to 5 $\mu$m.

Among these polishing grains, polycrystalline diamond is preferred in point of view a delicateness of processing and a high abrading efficiency.

As liquids for the polishing slurry, there can be used water, alcohols such as propylene glycol, water-based liquids or alcohol-based liquids.

The content of the polishing grains in the polishing slurry is preferably in the range of 0.1 to 1.0% by weight.

In addition, as the polishing tape in the texturing process of the present invention, polishing tapes made of fibers having a fineness of not more than 0.1 denier are used. In this case, shapes of the tapes are not particularly restricted, and there may be used any of woven fabric tapes, non-woven fabric tapes, flocked tapes, braided tapes and the like. In the case of flocked tapes, fibers flocked on the tapes having a fineness of not more than 0.1 denier may be usable.

Also, in the present invention, the ratio of an average diameter of fibers used in the polishing tape to an average particle size of the polishing grains is usually in the range of 0.5 to 50, preferably 1 to 10.

When the afore-mentioned condition is satisfied, the surface roughness (Ra) of the substrate can be extremely reduced.

In the texturing in the present invention may be used a polishing lubricant. The polishing lubricant used in the present invention may include any known oily materials which can enhance the polishing effect, and have functions such as penetration into fine sites to be abraded, reduction in abrasive friction, lubrication for reducing wear of polishing grains and cooling for lowering the abrasion temperature.

As the suitable polishing lubricants, there may be used water-soluble polishing lubricants such as emulsion-type water-soluble polishing lubricants, translucent emulsion-type water-soluble polishing lubricants or solution-type water-soluble polishing lubricants.

The water-soluble polishing lubricants may be usually composed of an emulsified agent, an emulsifying agent (surfactant), a rust preventive, additives, water or the like. The emulsified agent may be composed of a base oil, an oily agent and extreme-pressure additives such as chlorinated paraffin or sulfide fatty oil. As the emulsifying agents, there may be exemplified anionic surfactants such as fatty acid soap, naphthenic acid soap or petroleum sulfinic acid soap, nonionic surfactants such as polyoxyethylene derivatives, sorbitan esters or alkylol amides, or the like. The rust preventive may be composed of an organic compound such as carboxylic acid derivatives or amine compounds, an inorganic compound such as phosphates or borates, a pH adjuster or the like. As the additives contained in water-soluble polishing lubricant, there may be exemplified an antiseptic agent, an anti-forming agent, a coupling agent or the like.

As the afore-mentioned water-soluble polishing lubricants, there can be suitably used, for example, "PS COOL" (produced by MIKI SANGYO CO., LTD.), "YUSIRONTEC" (produced by YUSIRO KAGAKU CO., LTD.), or the like.

The amount of the polishing lubricant added to the polishing slurry is preferably not less than 0.01% by volume, more preferably 0.1 to 30% by volume. When the amount of the polishing lubricant added is Less than 0.01% by volume, a sufficient effect by the addition of the polishing lubricant may not be obtained. On the other hand, when the amount of the polishing lubricant added is more than 30% by volume, it becomes difficult to mix the polishing lubricant in the slurry, so that there may arise a risk that a homogeneous slurry may not be obtained.

The water-soluble polishing lubricant may be added to the polishing slurry either as it is or in the form of a solution diluted with solvent such as water. Especially, in the case where alcohol such as propylene glycol is used as liquid for the slurry, it is preferred that a solution prepared by diluting the water-soluble polishing lubricant with water is added to the polishing slurry. In this case, the dilution is preferably carried out such that the concentration of the water-soluble polishing lubricant in water lies in the range of 0.1 to 50% by volume.

Figure 2:
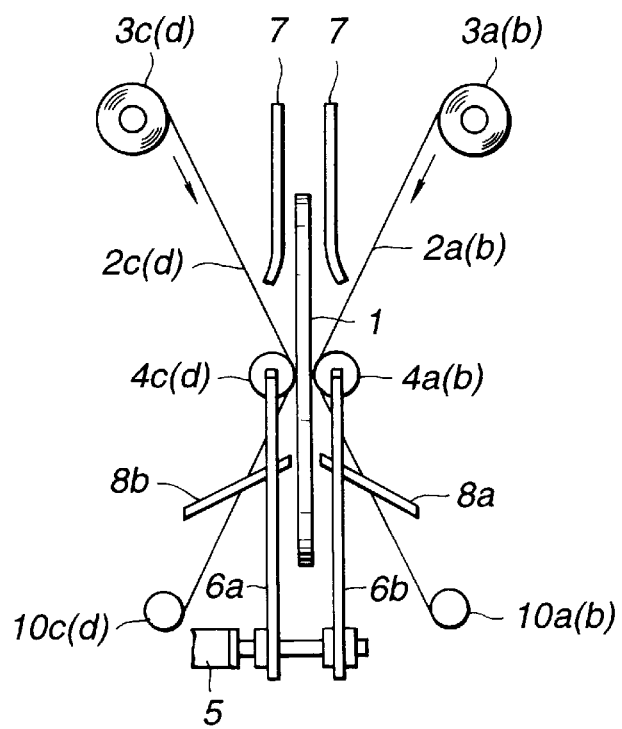

Next, the texturing according to the present invention is explained in detail by referring to FIGS. 1 and 2.

In FIG. 1, on each of front and rear surfaces of a disc-shaped substrate 1 which rotates in the direction indicated by an arrow A, two polishing tapes, i.e., four polishing tapes 2a to 2d in total, are drawn in parallel from polishing tape rolls 3a to 3d. The polishing tapes 2a to 2d are pressed against a surface of the substrate 1 by means of four contact rollers 4a to 4d which have rotation axes extending in the direction of diameter of the substrate, respectively.

The contact rollers 4a to 4d are urged toward the surface of the substrate 1 by a roll-pressing cylinder 5 and rod members 6a and 6b such that the tape is pressed thereby against the substrate with a predetermined pressure.

The polishing tapes 2a to 2d are continuously supplied from the polishing tape rolls 3a to 3d and transported in the direction indicated by an arrow B, so that a fresh surface of each tape always comes into contact with the surface of the substrate 1. The respective polishing tapes 2a to 2d used are wound on wind-up rolls 10a to 10d, respectively.

Further, the contact rollers 4a to 4d are caused to vibrate in the direction indicated by an arrow C by means of a vibrating apparatus (not shown). The amplitude of vibration applied can be optionally determined according to the aimed applications, but is usually in the range of about ±0.5 mm to about ±3.0 mm.

In addition, nozzles 7 for injecting the polishing slurry are disposed in close proximity to positions where the respective polishing tapes 2a to 2d transported are brought into contact with the substrate 1, usually on an upstream side of these positions. The polishing slurry is injected from the nozzles toward the surfaces of the polishing tapes 2a to 2d and adheres thereto.

Thus, when the polishing tapes 2a to 2d supplied from the tape rolls 3a to 3d are pressed against the rotating substrate 1 by means of the contact rollers 4a to 4d, the polishing solution is simultaneously supplied from the nozzles 7 toward the surfaces of the polishing tapes and the contact rollers 4a to 4d is caused to be vibrated, the surface of the substrate 1 is abraded to apply the texturing thereto.

Also, the polishing lubricant may be supplied to the substrate 1 independently from the polishing slurry.

In the case where the polishing lubricant is independently supplied to the substrate 1, nozzles 8a and 8b are arranged such that the polishing lubricant injected from the nozzles is supplied to appropriate positions of the rotating substrate 1 and adheres thereto, as shown in FIG. 1.

The positions of the substrate 1 to which the polishing lubricant is supplied may be determined by taking into consideration the rate of expansion of the lubricant by a centrifugal force exerted due to the rotation of the substrate 1 such that the polishing lubricant can be effectively fed to the contact portions between the polishing tapes 2 and the substrate 1.

When the polishing lubricant is supplied onto the rotating substrate 1, the polishing lubricant is caused to be expanded outward by the centrifugal force exerted due to the rotation of the substrate 1 and lubricates portions to be abraded, thereby effectively conducting the abrasion of the lubricated portions.

The polishing conditions for the texturing according to the present invention are as follows. The concentration of polishing grains suspended in the polishing slurry is in usually the range of 0.01 to 1.0% by weight. The number of rotation of the disc-shaped substrate is usually in the range of 50 to 3,500 rpm, preferably 600 to 1,400 rpm. The number of reciprocating motions (oscillation frequency) of the polishing tape in the radial direction of the disc-shaped substrate is usually in the range of 0 to 5,000 times per minute, preferably 100 to 2,000 times per minute. The pressing force exerted on the contact rollers by the roller-pressing cylinder is usually in the range of 1.0 to 3.0 kg/cm$^2$. The polishing time is usually in the range 5 to 60 seconds. The feed speed of the polishing tapes is usually in the range of 1 to 10 mm/s.

Incidentally, in the texturing method illustrated in FIGS. 1 and 2, the polishing slurry is supplied between the polishing tapes 2 and the substrate 1 so as to be coated onto the polishing tapes immediately before the abrasion is conducted. Alternatively, the polishing slurry may be coated on the tapes 2 in advance.

In accordance with the present invention, when the texturing in the present invention is applied, the finished surface of the substrate 1 can exhibit an average surface roughness Ra of usually not more than 50 Å, preferably not more than 20 Å, more preferably not more than 15 Å, and a maximum projection height Rp of usually not more than 400 Å, preferably not more than 100 Å, more preferably not more than 80 Å. Further, the thus-treated surface of the substrate may have such trace patterns that the traces formed by the texturing are crossed with each other at an angle (crossing angle) of usually 0° to 40°, preferably 10° to 35°.

Incidentally, in the present invention, the surface condition of the substrate is defined according to JIS "surface roughness" (B0601).

The required surface roughness Ra and maximum projection height Rp of the substrate can be obtained by appropriately controlling the polishing conditions using the polishing slurry, especially by controlling the particle size of the polishing grains, the peripheral speed (rotating speed) of the disc-shaped substrate, the feed speed of the polishing tapes, the number of reciprocating motions (oscillation frequency) of the polishing tapes, the pressing force by the cylinder, the polishing time within the afore-mentioned ranges.

Whereas, the required angle (crossing angle) of the traces formed by the texturing can be attained by appropriately controlling the peripheral speed of the disc-shaped substrate and the number of reciprocating motions (oscillation frequency) of the polishing tapes within the afore-mentioned ranges.

The surface of the substrate to which the afore-mentioned texturing has been applied may be further subjected to a second-stage texturing process. By applying the second-stage texturing process, the substrate can be further improved in the flying property.

In such a second stage texturing process, protrusions such as fins, burrs or the like can be selectively removed form the surface of the substrate while the surface roughness Ra and the crossing angle of traces which are formed in the first stage texturing process, are kept substantially unchanged, thereby adjusting the maximum projection height Rp thereof to such a preferred range of about 30 to about 200 Å.

In the second stage texturing process, the polishing grains and the polishing tapes can also be used. In this case, as the polishing tapes, there can be suitably used non-woven fabric tapes such as cellulose tapes, nylon tapes or rayon tapes, or polyurethane-based flocked tapes.

Similarly to the first stage texturing process, the polishing tapes used in the second stage texturing process may be made of fibers having a fineness of not more than 0.1 denier.

In addition, WA-based polishing tapes, green carbon (GC)-based polishing tapes or the like may also be used in the second stage texturing process. As the polishing grains used in the second stage texturing process, there may be exemplified those polishing grains having a particle size of 0.1 to 10 μm, such as WA-based polishing grains, SiC-based polishing grains or diamond-based polishing grains. Further, the polishing grains can be used in the form of a liquid slurry prepared by suspending the polishing grains together with a dispersant in water-based or alcohol-based liquid.

Alternatively, the polishing tapes can be used singly without the polishing grains.

The second stage texturing process can be performed by using the same texturing apparatus as shown in FIG. 1.

The slurry polishing conditions of the second stage texturing process are not particularly restricted, and it can be conducted under such conditions that the disc rotating speed is usually 50 to 1,500 rpm; the number of reciprocating motions (oscillation frequency) is usually 50 to 400 times per minute; the cylinder pressing force is usually 1.0 to 3.0 kg/cm$^2$; and the polishing time is usually 3 to 30 seconds.

The thus-textured substrate 1 may be usually washed with a neutral detergent, an alkaline detergent or the like, and then washed with superpure water.

After the afore-mentioned washing treatment, the substrate is formed thereon with an undercoat metal layer made usually of chromium, copper or the like by a sputtering method. The thickness of the undercoat layer is usually in the range of about 50 to 20,000 nm.

Next, a magnetic layer and a protective layer are successively formed over the undercoat layer.

The magnetic layer may be usually in the form of a thin film made usually of cobalt-based ferromagnetic alloy such as Co—Cr, Co—Ni, Co—Cr—X, Co—Ni—X or Co—W—X, wherein X is one or more elements selected from the group consisting of Li, Si, P, Ca, Ti, V, Cr, Ni, As, Y, Zr, Nb, Mo, Ru, Ag, Sb, Hf, Ta, W, Re, Os, Ir, Pt, Au, La, Ce, Pr, Nd, Pm, Sm, Eu and B. The magnetic layer may be formed by a sputtering method. The thickness of the magnetic layer is usually in the range of about 100 Å to about 1,000 Å.

The protective layer may be in the form of a carbon film, a hydrogenated carbon film, a nitrogenated carbon film, a carbide film such as TiC or SiC, a nitride film such as SiN or TiN, an oxide film such as SiO, $Al_2O_3$ or ZrO, or the like. The protective layer may be usually formed by a deposition method, a sputtering method, an ion plating method, a wetting method or the like. The thickness of the protective layer is usually in the range of about 50 Å to about 1,000 Å.

Further, an ordinary lubricating layer may be formed on the protective layer. As the lubricants contained in the lubricating layer, there may be used, for example, fluorine-based liquid lubricants. The lubricating layer may be usually formed on the protective layer by a dip coating method, a spin coating method, a spray coating method or the like. The thickness of the lubricating layer is usually in the range of about 15 Å to about 50 Å.

EXAMPLES

The present invention is described in more detail by way of examples, but these examples are not intended to limit the scope of the present invention.

Examples 1 to 3 and Comparative Examples 1 to 2

A disc-shaped substrate made of aluminum alloy was subjected to an electroless plating process to form an Ni—P layer having a thickness of 15 µm thereon. The surface of the thus-obtained substrate was polished and then subjected to a texturing process as illustrated in FIGS. 1 and 2, in which polishing tapes were used and the average particle size of polishing grains was varied within the range of 0.1 to 3 µm.

Figure 3:
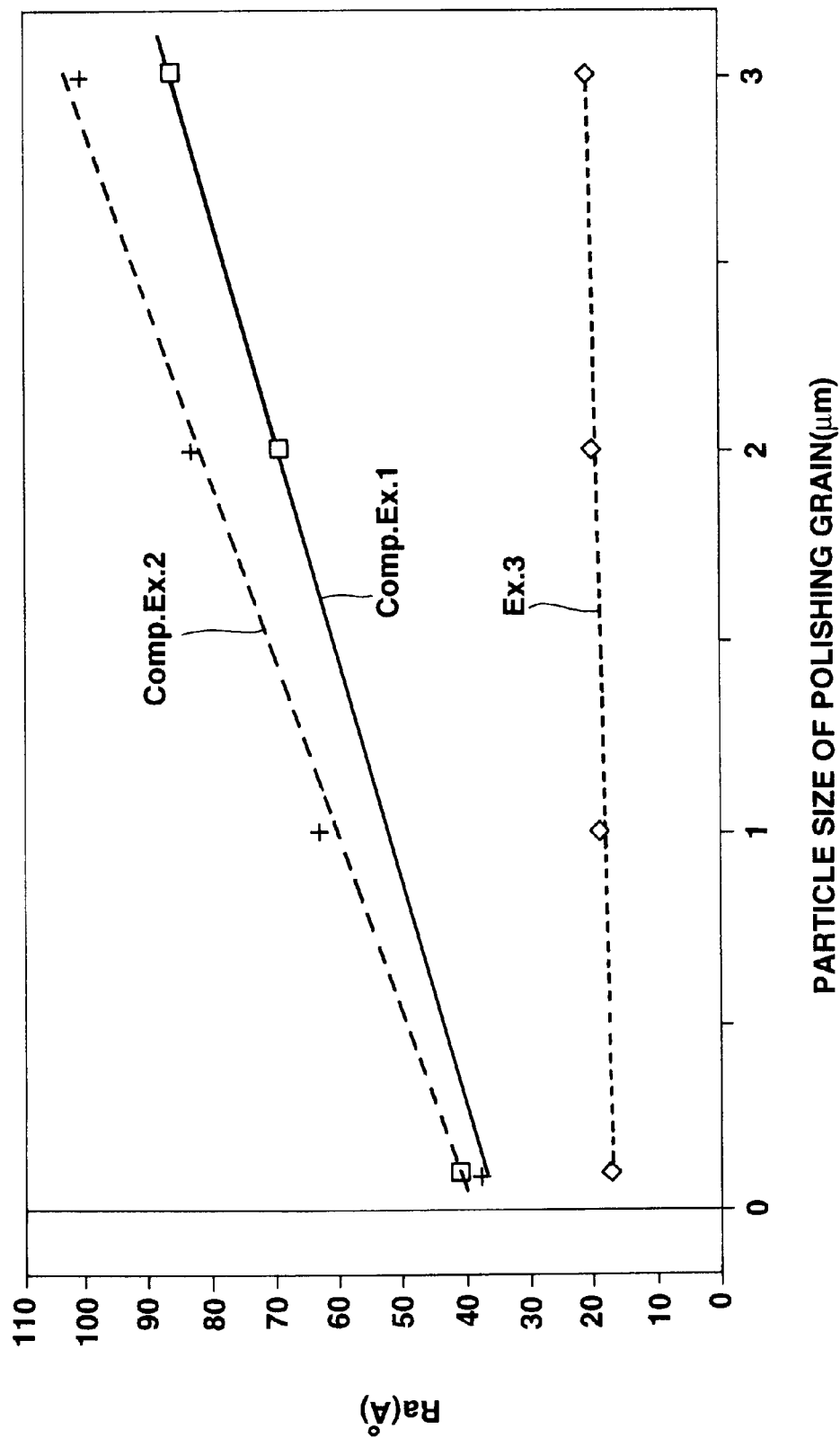

As shown in FIG. 3, when the polishing tapes according to the present invention were subjected to the texturing process, the surface roughness (Ra) of each of the textured substrates could be considerably reduced as compared to those obtained by using conventional polishing tapes.

Also, in the case where the conventional polishing tapes were subjected to the texturing process, the surface roughness (Ra) of each of the textured substrates was increased approximately proportional to the increase in average particle size of the polishing grains used. On the other hand, in the case where the polishing tapes according to the present invention were used, the surface roughness (Ra) of each textured substrate could be maintained at a low level even though the polishing grains having an increased average particle size were used.

Example 4

The polishing process was conducted using a polishing apparatus having such a mechanism that the shaft of the pressing roller 70 was vibrated by means of a cam, under the below-mentioned conditions.
Preparation of Polishing Slurry Polycrystalline diamond particles having an average particle size of 0.1 µm were dispersed in water to form a diamond slurry having a solid content of 0.04% by weight. A nonionic surfactant was added to the diamond slurry in an amount of 10% by weight to form a polishing slurry.
Conditions of Polishing Process Substrate: Disc-shaped aluminum alloy plate electroless-plated with Ni—P (surface roughness (Ra) before polishing: 16 Å);

Number of revolution of substrate: 900 rpm;

Roller pressing force: 2.0 kg;

Amplitude of vibration of roller: 1 mm;

Vibration frequency: 1300 cycles per minute;

Direction of vibration: radial direction of substrate;

Polishing time: 10 seconds;

Tape used: Woven fabric whose surface was made of fibers having an average fineness of not more than 0.1 denier;

Tape speed: 1 mm/s;

Number of samples: 5 discs

The surface roughness of each of the substrates after polishing was measured by a surface roughness tester (ET30HK) under the following conditions: a measuring length of 0.25 mm; a diameter of stylus of 0.5 µmR; an applied load of 3 mg; and a measuring velocity of 20 µm/s.

As a result, it was confirmed that the average surface roughness (Ra) of the substrate was 10 Å. The surface of the substrate was measured by a surface discontinuity analyzer using a laser beam to ascertain whether any scratches having a width of 1 to 3 µm and a length of not more than 20 µm were present thereon. As a result, no mocroscratches were detected on the surface of each substrate.

Comparative Example 3

The same polishing and evaluating procedures as defined in Example 3 were conducted except that a polishing slurry containing single crystal particles having an average particle size of 0.1 µm was used.

The thus-obtained substrate was measured with respect to the surface roughness (Ra), the polishing rate and the percentage of existence of microscratches.

As a result, it was confirmed that the average surface roughness Ra of the substrate was 17 Å and found microscratches on every samples.

TABLE 1

|  | Example 1 | Example 2 | Example 3 | Comp. Example 1 | Comp. Example 2 |
|---|---|---|---|---|---|
| Average fineness of fiber (denier) | 0.1 | 0.1 | 0.001 | 1.0 | 0.6 |
| Fiber material | Polyester/Nylon | Polyester/Nylon | Polyester | Nylon | Nylon |
| Shape of tapes | Non-woven fabric tape | Woven fabric tape | Woven fabric tape | Flocked tape | Flocked tape |
| Commercial Name | WP8085 | — | — | — | FP404* |

(Note)
*: Flocked tape "FP404" produced by MIPOX Corp.

Examples 5 to 7 and Comparative Example 4

A disc-shaped substrate made of aluminum alloy having Ni—P layer (surface roughness (Ra) is 22 Å). The surface of this substrate was polished and then subjected to a texturing process as illustrated in FIGS. 1 and 2, in which as the polishing tape, non-woven polishing tapes made of nylon and polyester fiber (fiber diameter: 3–5 µm) and as the polishing slurry, "GTX" produced by Fujimi Inc., (polishing slurry containing polishing grains made of propylene glycol/diamond grain (an average diameter: 0.1 µm and grain content: 0.4 wt %)) were used. As the polishing lubricant, "PSCOOL" produced by Miki Sangyo Co., Ltd. was added to the polishing slurry.

The texturing conditions were set forth below.

Disc rotation speed: 1,200 rpm
Oscillation speed of the contact rollers: 1,900 times/min.
Contact roller pressure: 1.5 kg/cm²
Polishing tape speed: 2.0 mm/sec
Polishing slurry supplying rate: 0.36 ml/sec
The result are shown in Table 2.

Examples 8 to 10

The same conditions as the Examples 5 to 7 except that the polishing lubricant is changed to the water solution of "PSCOOL" (PSCOOL/water weight ratio=⅔).

The result are shown in Table 3.

According to Examples 4 to 10, by the use of the polishing lubricant, it is obtain stable surface roughness with the abrading time and easy control of surface roughness of the disc.

TABLE 2

|  | Comparative Example 4 |  |  | Example 5 |  |  |
|---|---|---|---|---|---|---|
| Amount of polishing lubricant added | 0 |  |  | 5 |  |  |
| Polishing time (sec) | 5 | 10 | 15 | 5 | 10 | 15 |
| Polishing amount (g) | 1.2 | 2.3 | 3.5 | 2.1 | 3.2 | 3.9 |
| Ra (Å) | 18 | 22 | 13 | 16 | 14 | 14 |

|  | Example 6 |  |  | Example 7 |  |  |
|---|---|---|---|---|---|---|
| Amount of polishing lubricant added | 10 |  |  | 20 |  |  |
| Polishing time (sec) | 5 | 10 | 15 | 5 | 10 | 15 |
| Polishing amount (g) | 2.8 | 4.6 | 5.5 | 3.7 | 6.2 | 6.9 |
| Ra (Å) | 18 | 13.5 | 13.5 | 19.5 | 22.5 | 16.5 |

TABLE 3

|  | Example 8 |  |  |  | Example 9 |  |  |  |
|---|---|---|---|---|---|---|---|---|
| Concentration of polishing lubricant solution (%) | 5 |  |  |  | 10 |  |  |  |
| Polishing time (sec) | 4 | 8 | 12 | 16 | 4 | 8 | 12 | 16 |
| Polishing amount | 2.1 | 3.75 | 5.7 | 7.65 | 2.55 | 4.7 | 7.05 | 9.4 |
| Ra (Å) | 15.5 | 16 | 15 | 14.5 | 15 | 14.5 | 14.5 | 14 |

|  | Example 10 |  |  |  |
|---|---|---|---|---|
| Concentration of polishing lubricant solution (%) | 20 |  |  |  |
| Polishing time (sec) | 4 | 8 | 12 | 16 |
| Polishing amount | 2.7 | 4.9 | 7.4 | 9.85 |
| Ra (Å) | 16 | 14 | 15 | 14.5 |

What is claimed is:

1. A method for polishing or texturing a magnetic disc, comprising bringing a tape traveled in a predetermined direction and made of fibers having a fineness of not more than 0.1 denier, and a slurry containing polishing grains dispersed therein, into contact with a substrate of the magnetic disc.

2. A method according to claim 1, wherein said slurry contains the polishing grains having an average particle size of 0.05 μm to 10 μm in an amount of 0.01 to 1.0% by weight.

3. A method according to claim 1, wherein said slurry contains a polishing lubricant in an amount of not less than 0.01% by volume.

4. A method according to claim 1, wherein said slurry contains the polishing grains having an average particle size of 0.05 to 10 μm in an amount of 0.01 to 1.0% by weight and a polishing lubricant in an amount of not less than 0.01% by volume.

5. A method according to claim 1, wherein said tape is vibrated in the predetermined traveling direction thereof while coming into contact with the substrate.

6. A method according to claim 1, wherein said polishing grains contain polycrystalline diamond.

7. The method according to claim 1, wherein the surface roughness is reduced and predetermined traces are formed by texturing or polishing the surface having a large surface roughness.

* * * * *